United States Patent
Reuter

(10) Patent No.: US 7,588,052 B2
(45) Date of Patent: Sep. 15, 2009

(54) CLOSURE PLUG

(75) Inventor: Martin Reuter, Dachau (DE)

(73) Assignee: Marco Systemanalyse und Entwicklung GmbH, Dachau (DE)

( * ) Notice: Subject to any disclaimer, the term of this patent is extended or adjusted under 35 U.S.C. 154(b) by 0 days.

(21) Appl. No.: 12/207,215

(22) Filed: Sep. 9, 2008

(65) Prior Publication Data

US 2009/0065082 A1    Mar. 12, 2009

(30) Foreign Application Priority Data

Sep. 10, 2007    (DE) ................. 10 2007 042 997

(51) Int. Cl.
*F16L 55/10*    (2006.01)
(52) U.S. Cl. ............... 138/89; 138/90; 220/234; 29/522.1
(58) Field of Classification Search ................. 138/89, 138/90; 220/234, 233
See application file for complete search history.

(56) References Cited

U.S. PATENT DOCUMENTS

| | | | | |
|---|---|---|---|---|
| 2,821,323 A * | 1/1958 | Lee, II | ............. | 220/233 |
| 3,825,146 A * | 7/1974 | Hirmann | ............. | 220/234 |
| 4,867,333 A * | 9/1989 | Kolp et al. | ............. | 220/234 |
| 5,078,294 A * | 1/1992 | Staubli | ............. | 220/233 |
| 5,160,226 A * | 11/1992 | Lee, II | ............. | 411/72 |
| 5,779,085 A * | 7/1998 | Havlinek et al. | ............. | 220/234 |
| 5,816,292 A | 10/1998 | Wilson et al. | | |

FOREIGN PATENT DOCUMENTS

DE    102 20 620 A1    11/2003
DE    698 19 226 T2    8/2004

OTHER PUBLICATIONS

German Search Report for corresponding German Patent Application No. 10 2007 042 997.7, dated Jun. 12, 2008, 4 pages.
English Translation of German Search Report for corresponding German Patent Application No. 10 2007 042 997.7, dated Jun. 12, 2008, 4 pages.

* cited by examiner

*Primary Examiner*—Patrick F Brinson
(74) *Attorney, Agent, or Firm*—Lewis and Roca LLP

(57) ABSTRACT

A closure plug for bores, including a cylindrical jacket of through hardened steel, whose outer peripheral surface features a toothed design.

3 Claims, 1 Drawing Sheet

CLOSURE PLUG

CROSS-REFERENCE TO RELATED APPLICATIONS

This application claims priority to German Patent Application Number 10 2007 042 997.7, filed Sep. 10, 2007, which is hereby incorporated by reference as if set forth herein.

BACKGROUND OF THE INVENTION

The present invention relates to a closure plug for bores, including a cylindrical steel jacket whose outer peripheral surface features a toothed design.

Such closure plugs are principally known and are used to close off bores in hydraulic systems. Known closure plugs are formed in cup shape and are deformed with the aid of a ball pressed into the cup, or that their toothed design claws itself into the walls of the bore. This means that the jacket has to consist of a relatively soft material, as otherwise this can not be stretched with the aid of a ball or a cone. Problematic here is that for high pressures such closure plugs can, in individual cases, be released from the bore.

BRIEF DESCRIPTION OF THE INVENTION

The object of the present invention is to create a closure plug, which guarantees a secure anchorage in the corresponding bore with low production costs and simple installation.

This object is satisfied by a closure plug (10) for bores, including a cylindrical steel jacket (14), whose outer peripheral surface features a toothed design (16), wherein the closure plug (10) consists of through hardened steel.

The closure plug in accordance with the invention is based on the recognition that, for a relatively soft material or an only surface hardened material, a secure captivation of the closure plug in the bore is not guaranteed. The closure plug in accordance with the invention can be inserted with a setting tool into a smooth bore, independent of the roughness of the surface of the bore. As the closure plug consists of through hardened steel, this is not plastically deformed during the insertion into a bore.

Advantageous embodiments of the invention are described in the specification, the drawing and the subordinate claims.

In accordance with a first advantageous embodiment, the outer diameter of the toothed design increases, through which a simple insertion of the closure plug to the corresponding bore is guaranteed. In particular when the outer diameter of the toothed design continuously increases, the closure plug is wedged particularly firmly in the bore by the toothed design of its jacket.

In accordance with a further embodiment of the invention, the jacket can have a cylindrical portion, in which the tips of the toothed design are arranged on a conical surface, which encloses an angle of somewhat less than 180° to the cylindrical portion and which extends and in particular extends conically from the cylindrical portion. In this embodiment a simple insertion of the closure plug into the bore is guaranteed by the cylindrical portion, in which the tips of the toothed design arranged on the conical surface make sure that with an increased driving of the closure plug into the bore an increased deeper wedging occurs.

In accordance with a further advantageous embodiment the jacket can have a first cylindrical portion, followed by the toothed design and, following the toothed design, a further cylindrical portion can be provided whose outer diameter is smaller than that of the first cylindrical portion. In this way a contraction is created, by the further cylindrical portion, in the region of the outer front end, or the outer front side, of the closure plug, which can be used for a form fitted connection in that the surrounding material of the bore is clinched when the closure plug is set in place. In this way the closure plug is not only secured by the toothed design but also additionally by the clinched portion.

If a guiding recess for a setting tool is provided in the jacket, this can be placed or applied particularly easily and precisely, when the closure plug is inserted into the bore.

In accordance with a further advantageous embodiment of the invention, a transverse wall can be provided in the jacket and is provided in the axial direction in the region of the toothed design. Such a transverse wall forms a cross brace for the walls of the jacket surrounding it, so that the jacket does not unwantedly bend inwards upon insertion of the closure plug into the bore. In particular, when the transverse wall of the bore is arched in the insertion direction of the closure plug, a fluid pressure applied to the transverse wall causes the closure plug to be additionally wedged into the bore by the transverse wall, as the force generated by the applied pressure is deflected via the transverse wall onto the inner side of the jacket. In this context it can be advantageous if the transverse wall is arranged in the axial direction approximately at the middle of the closure plug, as in this case the transverse wall stabilizes the closure plug in an optimal way.

Steels, in particular stainless steels, which have a Rockwell hardness C of approximately 25 to 50 can be considered as advantageous materials for the manufacture of the closure plug formed as one piece.

In accordance with a further aspect of the present invention this relates to a setting tool for the insertion of the above described closure plug into a bore, for which the setting tool has at its front end a central guiding pin with a clinching ring surrounding it. With the aid of the guiding pin the setting tool can be precisely placed at the closure plug and after the insertion of the closure plug into the bore, a material surrounding the bore can be clinched, with the aid of the clinching ring, so that a further form fitted connection can be created between the closure plug and the surrounding material.

In accordance with an advantageous embodiment, the clinching ring has a triangular cross section and includes a clinching surface extending perpendicular to the front side, which is used as a cutting edge during the clinching process. Furthermore, the clinching ring can have a clinching surface extending at an obtuse angle from the front side of the setting tool, to induce a particularly good material displacement.

In accordance with a further advantageous embodiment the setting tool has a coining element provided at its front side. With such a coining element it can be reliably checked, whether the setting tool was set deep enough during the setting process, i.e. such a coining element can be used for the quality control.

If the coining element is a ring shaped projection, then it can additionally be identified, whether the setting tool was set perpendicularly or at an angle, so that the coined impression left in the material surrounding the bore can also be used to draw a conclusion on the quality of the installation.

In accordance with a further aspect of the present invention it relates to a method to set a closure plug as described above using a setting tool as described above as well as a body with a bore, into which a closure plug as described above is inserted.

BRIEF DESCRIPTION OF THE DRAWINGS

The present invention will be described in the following, purely by way of example with reference to an advantageous embodiment and to the included drawings. They show.

DETAILED DESCRIPTION OF THE INVENTION

Figure 1:
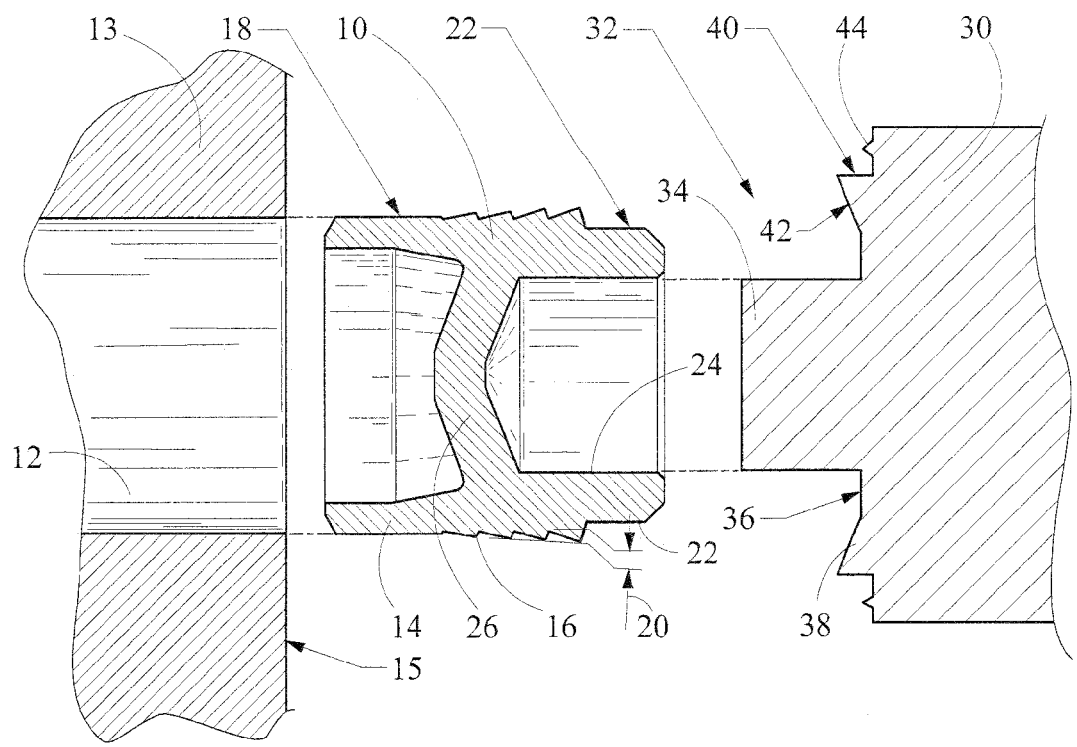
FIG. 1 is a cross sectional view of a closure plug and a setting tool before the insertion into a bore of a body.

FIG. 1 shows a closure plug 10 to be inserted into a cylindrical bore 12 of a body 13 of solid material which for example, consists of steel. Here the closure plug 10 is formed in one piece from through hardened stainless steel, through which it can not be plastically deformed. It includes a jacket 14 whose outer peripheral surface features a toothed design 16, which is formed in saw tooth like manner.

As is shown in FIG. 1, the tips of the toothed design 16 are arranged on a conical surface, which encloses an angle with the cylindrical portion 18 of the jacket 14, which is only somewhat smaller than 180°. In other words, the outer diameter of the toothed design 16 continuously increases from the cylindrical portion 18 of the jacket in the direction of the outer end of the closure plug.

Viewed in the axial direction the cylindrical portion 18 of the jacket 14 is initially followed by the toothed design 16 and, following the toothed design 16, i.e. at the forward end of the closure plug 10, a further cylindrical portion 22 is provided, whose diameter is smaller than the diameter of the first cylindrical portion 18. In the region of this second cylindrical portion 22, as well as in the region of a part of the toothed design 16 at the front end of the closure plug, a cylindrical guiding recess 24 for a setting tool 30 is provided in the present embodiment.

Furthermore, inside the closure plug a transverse wall is provided, which is arranged in the axial direction approximately at the middle of the closure plug and in the region of the toothed design 16. This transverse wall 26 is arched in the insertion direction, i.e. in the direction of the bore 12, so that after the insertion of the closure plug a fluid pressure applied to the transverse wall stabilizes the closure plug in the bore.

The setting tool shown in FIG. 1 consists of a cylindrical shaft, at whose front end 32 a central guiding pin 34 is provided, this can be inserted into the guiding recess 24 of the closure plug 10. Viewed in the radial direction, a circular ring shaped pressing surface 36 follows this guiding pin 34, with which the closure plug 10 can be hammered into the bore 12 in the axial direction. Radially seen the front end 32 of the setting tool 30 includes a surrounding clinching ring 38 following the pressing surface 36, with a triangular cross section and includes a clinching surface 40 extending perpendicular to the pressing surface 24 as well as a clinching surface 42 extending at an obtuse angle from the pressing surface 36.

Radially outside the clinching or caulking ring 38 a coining element is also provided in the form of a ring shaped projection 44 at the front end 32 of the setting tool 30, which has a triangular cross section and in a plan view has the shape of a circular ring.

In the following a method for the setting of the closure plug 10 into the bore 12 of the body 13 will be described.

First of all the closure plug 10 with its first cylindrical portion 18 is inserted into the bore 12 surrounded by solid material, which is possible in a simple way, as the diameter of the cylindrical portion 18 and the bore 12 are matched to one another. Following this the guiding pin of the setting tool 30 is inserted into the guiding recess 24 of the closure plug 10 and the closure plug 10 is axially inserted from above with the help of a hammer or another tool into the bore 12, through which the toothed design 16 wedges itself into the walls of the bore 12. As the closure plug consists of through hardened steel and is stiffened with the aid of the transverse wall 26, the closure plug does not change its shape upon insertion, so that the toothed design digs itself into the body 13.

Figure 2:
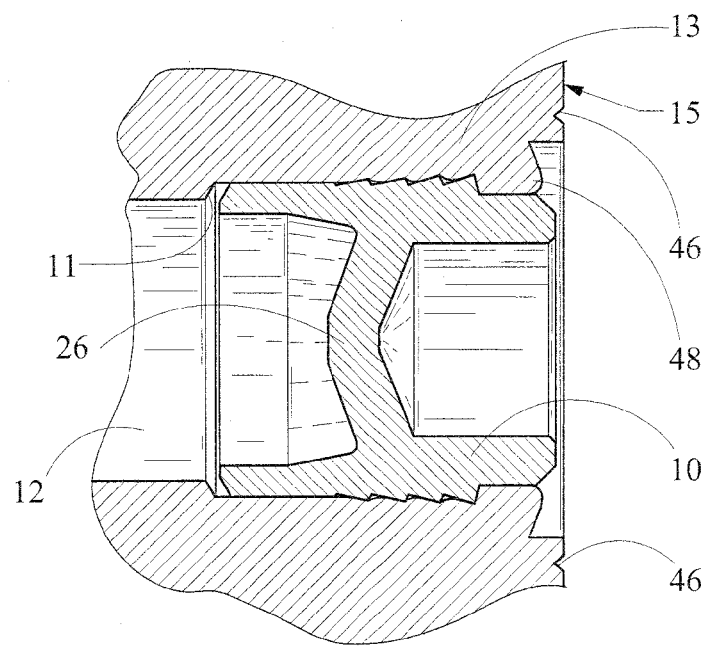
FIG. 2 is an enlarged sectional view of the closure plug of FIG. 1, which is inserted into the bore of the body.

As soon as the clinching ring 42 touches the front face 15 of the body 13, the clinching ring 38 displaces the material of the body in the direction of the closure plug 10 and fills the region between the outer toothed design and the second cylindrical portion 22 with material 48 (c.f. FIG. 2), whereby the closure plug into the bore it is additionally held in form fitted manner in the bore 12 simply by being driven into place.

Only when the setting tool 30 is pressed completely and with sufficient force against the front end 15 of the body 13, does the coining ring 44 press itself into the surface 15 of the body 13, so that following this a uniform, ring shaped coined impression 46 remains, which indicates that the closure plug is correctly wedged into the bore.

As is pointed out in FIG. 2, the bore 12 can be stepless and/or has to be stepless and that the closure plug 10 should not touch a step 11 of the bore.

The invention claimed is:

1. A closure plug, including a cylindrical steel jacket, whose outer peripheral surface features a toothed design wherein the closure plug consists of through hardened steel, a transverse wall is provided in a central portion in the jacket, the transverse wall is provided in the axial direction in the region of the toothed design, and is arched in the insertion direction of the closure plug.

2. A closure plug, including a cylindrical steel jacket, whose outer peripheral surface features a toothed design wherein the closure plug consists of through hardened steel, a transverse wall is provided in the jacket, the transverse wall is provided in the axial direction in the region of the toothed design, and is arranged in the axial direction approximately at the middle of the closure plug.

3. A body with a bore into which a closure plug is inserted, the closure plug including a cylindrical steel jacket, whose outer peripheral surface features a toothed design, and which consists of through hardened steel, wherein the bore is stepless or in that the closure plug does not touch a step of the bore and the closure plug is wedged into the bore through the toothed design and is additionally clinched into the bore with a clinched portion.

* * * * *